United States Patent
Pereira et al.

(10) Patent No.: US 12,506,345 B2
(45) Date of Patent: Dec. 23, 2025

(54) AIRCRAFT AND METHOD OF OPERATING AN AIRCRAFT POWER SYSTEM MODULE

(71) Applicant: GE Aviation Systems Limited, Gloucestershire (GB)

(72) Inventors: Frazer Pereira, Cheltenham (GB); Adam Llywelyn Rudkin, Cheltenham (GB); Aishwarya Kollon, Bengaluru (IN)

(73) Assignee: GE Aviation Systems Limited, Gloucestershire (GB)

(*) Notice: Subject to any disclaimer, the term of this patent is extended or adjusted under 35 U.S.C. 154(b) by 578 days.

(21) Appl. No.: 18/078,543

(22) Filed: Dec. 9, 2022

(65) Prior Publication Data
US 2023/0303257 A1    Sep. 28, 2023

(30) Foreign Application Priority Data
Mar. 24, 2022 (IN) .............. 202211016656

(51) Int. Cl.
*H02J 7/00* (2006.01)
*B60L 50/50* (2019.01)
(Continued)

(52) U.S. Cl.
CPC ............ *H02J 7/0013* (2013.01); *B60L 50/50* (2019.02); *B60L 58/18* (2019.02);
(Continued)

(58) Field of Classification Search
CPC .... H02J 7/0013; H02J 2310/44; H02J 7/0063; H02J 7/345; H02J 2207/50; B60L 50/50;
(Continued)

(56) References Cited

U.S. PATENT DOCUMENTS 6,104,967 A    8/2000 Hagen et al.
6,738,692 B2 *  5/2004 Schienbein .......... H02M 7/003
                                                    700/286
(Continued)

FOREIGN PATENT DOCUMENTS

CN    110864900 A  *  3/2020  ............ G01M 13/04
GB    2580373 A1    7/2020
(Continued)

OTHER PUBLICATIONS

Gaizka Martinez et al., "Novel Modular Device for a Decentralised Electric Power System Architecture for More Electric Aircraft" (Year: 2022).*

*Primary Examiner* — M Baye Diao
(74) *Attorney, Agent, or Firm* — Thomas | Horstemeyer, LLP (57) ABSTRACT

An aircraft and method, including a power distribution network and a set of dischargeable power system modules. The dischargeable power system module can include a chassis, a set of replaceable dischargeable energy modules selectively interconnected within the chassis, and an energy management module having a controller module configured to operably control the power distribution from the set of energy modules during aircraft operations, based on the energy demands of the respective subset of the power-consuming subsystems.

20 Claims, 6 Drawing Sheets (51) Int. Cl.
  *B60L 58/18*    (2019.01)
  *B64D 27/355*   (2024.01)
  *B64D 27/357*   (2024.01)
  *B64D 27/359*   (2024.01)

(52) U.S. Cl.
  CPC ......... *B60L 2200/10* (2013.01); *B64D 27/355* (2024.01); *B64D 27/357* (2024.01); *B64D 27/359* (2024.01); *B64D 2221/00* (2013.01); *H02J 2310/44* (2020.01)

(58) Field of Classification Search
  CPC ...... B60L 58/18; B60L 2200/10; B60L 53/80; B64D 27/355; B64D 27/357; B64D 27/359; B64D 2221/00; G06Q 10/06; G06Q 10/06313; G06Q 10/06315; G06Q 50/06; G08G 5/30; H01M 8/04298; H01M 10/42
  USPC ....................................................... 320/125
  See application file for complete search history.

(56) References Cited

U.S. PATENT DOCUMENTS

| | | | |
|---|---|---|---|
| 7,207,521 B2 * | 4/2007 | Atkey | B64D 41/00 244/58 |
| 7,598,706 B2 | 10/2009 | Koski et al. | |
| 8,406,936 B1 | 3/2013 | Borumand et al. | |
| 8,427,106 B2 | 4/2013 | Kim et al. | |
| 8,657,227 B1 * | 2/2014 | Bayliss | B64D 13/00 244/58 |
| 10,500,980 B2 | 12/2019 | Conlon et al. | |
| 10,554,055 B2 | 2/2020 | Yoon | |
| 11,065,973 B2 | 7/2021 | Compton et al. | |
| 11,128,162 B2 | 9/2021 | Chazal et al. | |
| 11,713,135 B2 * | 8/2023 | Ferrell | G08G 5/21 701/120 |
| 11,854,383 B2 * | 12/2023 | Nakhjavani | G08G 5/51 |
| 12,007,729 B1 * | 6/2024 | Ilic et al. | G05B 13/04 |
| 12,269,368 B2 * | 4/2025 | Pereira | B60L 58/10 |
| 2019/0315481 A1 * | 10/2019 | Elliott | B64D 41/00 |
| 2019/0337407 A1 | 11/2019 | Wang | |
| 2020/0028349 A1 * | 1/2020 | Elliott | G01R 15/16 |
| 2020/0036232 A1 | 1/2020 | Jones et al. | |
| 2020/0350640 A1 * | 11/2020 | Combs | B60L 58/14 |
| 2021/0188101 A1 * | 6/2021 | Abu Qahouq | B60L 53/16 |
| 2022/0009625 A1 | 1/2022 | Bower et al. | |
| 2022/0063431 A1 | 3/2022 | Gurusamy et al. | |
| 2022/0258645 A1 * | 8/2022 | Bower | B60L 53/66 |
| 2024/0270409 A1 * | 8/2024 | Mackay | B60L 53/80 |

FOREIGN PATENT DOCUMENTS

| | | |
|---|---|---|
| WO | 2007092955 A2 | 8/2007 |
| WO | 2017210170 A1 | 12/2017 |
| WO | 2019145777 A1 | 8/2019 |
| WO | 2019211659 A1 | 11/2019 |

\* cited by examiner

FIG. 6

AIRCRAFT AND METHOD OF OPERATING AN AIRCRAFT POWER SYSTEM MODULE

CROSS REFERENCE TO RELATED APPLICATION(S)

This application claims priority to and benefit of India Patent Application No. 202211016656, filed Mar. 24, 2022, which is incorporated herein in its entirety.

TECHNICAL FIELD

The disclosure relates to a method and system for operating a power distribution of an aircraft to meet a power demand for a flight plan of the aircraft. The disclosure also relates to a method of operating an energy management system for a fleet of aircraft.

BACKGROUND

Electrical power distribution systems manage the allocation of power from energy sources to electrical loads that consume the distributed electrical power. For example, contemporary aircraft utilize electrical power for electrical loads related to avionics, motors, and other electric equipment. Primary or supplemental power sources can provide the electrical power for a desired flight plan.

BRIEF DESCRIPTION

In one aspect, the present disclosure relates to an aircraft, including a power distribution network defining a set of power-consuming subsystems, and a set of dischargeable power system modules, each of the set of dischargeable power system modules associated with supplying power to a respective subset of the power-consuming subsystems. The dischargeable power system module further includes a chassis, a set of replaceable dischargeable energy modules selectively interconnected within the chassis, and an energy management module having a controller module configured to operably control the power distribution from the set of energy modules during aircraft operations, based on the energy demands of the respective subset of the power-consuming subsystems. Each of the set of dischargeable power system modules can operably share power between other dischargeable power system modules.

In another aspect, the present disclosure relates to a method of operating a dischargeable power system module of an aircraft, the dischargeable power system module having a set of replaceable dischargeable energy modules selectively interconnected to define at least one power system module power output, the method including receiving, at an energy management module having a controller module, a power demand for a set of power-consuming subsystems respectively associated with and operably powered by the dischargeable power system module, in response to receiving the power demand, selectively discharging at least a subset of replaceable dischargeable energy modules housed in a chassis of the dischargeable power system module to meet the power demand, estimating, by the energy management module, a cumulative flight operation power demand for the remainder of an aircraft flight operation, comparing, by the energy management module, the cumulative flight operation power demand with a quantity of dischargeable power of the dischargeable power system module, determining, by the energy management module, an excess quantity of dischargeable power exists based on the comparison when the quantity of dischargeable power of the dischargeable power system module is greater than the estimated cumulative flight operation power demand for the remainder of the aircraft flight operation, and operably sharing power between the dischargeable power system module and other dischargeable power system modules during at least one of an aircraft cruise phase, aircraft approach phase, or aircraft landing phase, in order to reduce the number of energy modules of the aircraft to be replaced in-between aircraft operations.

In one aspect, the present disclosure relates to a method of operating an energy management system for a fleet of aircraft, the method including receiving, by a controller module of the energy management system, a desired flight plan database for the fleet of aircraft, defining at least a desired flight plan for each of the fleet of aircraft and a location of each of the fleet of aircraft, receiving, by the controller module, a replaceable power source inventory database defining at least a set of dischargeable energy modules, estimating an energy demand for at least a subset of the desired flight plans for the fleet of aircraft, determining whether a set of dischargeable energy modules are locatable at a respective location of at least a subset of the fleet of aircraft based on at least the replaceable power source inventory database and the subset of desired flight plans of the desired flight plan database, and based on the determination that set of dischargeable energy modules are locatable at a respective location of at least a subset of the fleet of aircraft, generate, by the energy management system, a power source inventory distribution plan allocating a subset of dischargeable energy modules for the at least a subset of the desired flight plans for the fleet of aircraft.

DETAILED DESCRIPTION

Aspects of the disclosure can be implemented in any environment, apparatus, or method for operating power distribution by way of replaceable or dischargeable energy modules, systems associated with or managing power distribution by way of replaceable or dischargeable energy modules, vehicles utilizing power distribution by way of replaceable or dischargeable energy modules, or the like.

As used herein, the term "set" or a "set" of elements can be any number of elements, including only one. Also, as used herein, while sensors or systems can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The disclosure can be implemented in any electrical power distribution environment. A non-limiting example of an electrical circuit environment that can include aspects of the disclosure can include an aircraft power system architecture, land vehicle power system architecture, aqueous vehicle power architecture, unmanned vehicles, or the like.

Figure 1:
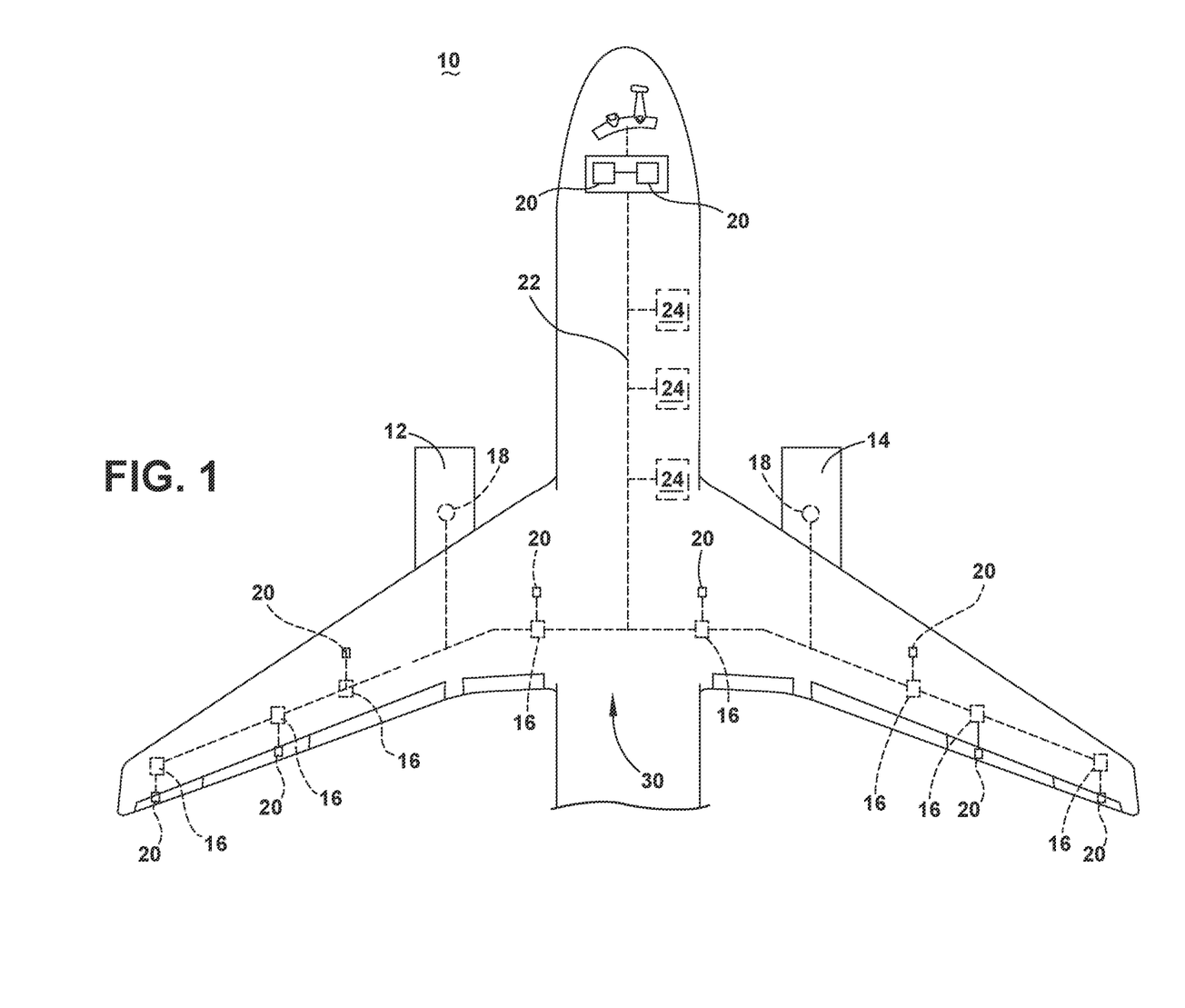
FIG. 1 is a top down schematic view of an aircraft and power distribution system of an aircraft, in accordance with various aspects described herein.

As illustrated in FIG. 1, an aircraft 10 is shown having at least one propulsion system, shown schematically as a left propulsion system 12 and a right propulsion system 14. Alternatively, the aircraft 10 can have fewer or additional propulsion systems. The left and right propulsion systems 12, 14 can be substantially identical, and can further include at least one power source, such as a first electric machine or a generator 18. In another non-limiting aspect of the disclosure, the left and right propulsion systems 12, 14 can be electric motors, and provide propulsion by way of converting electricity or electrical power into propulsion. The aircraft is shown further having a set of power-consuming components, power-consuming systems 20 or subsystems, or the like. Non-limiting examples of power-consuming systems 20 can include, but are not limited to, an actuator load, flight critical loads, non-flight critical loads, and propulsion systems 12, 14, as explained herein.

The power-consuming systems 20 are electrically coupled by way of a power distribution system 30 or power distribution network including, for instance, power transmission lines 22 or bus bars, and power distribution nodes 16. In this sense, the power distribution system 30 can define the set of power-consuming systems 20. The power distribution system 30 can further include at least one power system module 24 configured or adapted to selectively supply electrical power, at least a portion of primary power, supplemental power, redundant power, backup power, emergency power, or the like, to the power distribution system 30. In one non-limiting example, the power system module 24 can include a dischargeable power distribution system 30. In another non-limiting example, the power system module 24 can supply primary electrical power or supplemental electrical power to the power distribution system 30.

It will be understood that the illustrated aspect of the disclosure of FIG. 1 is only one non-limiting example of a power distribution system 30, and many other possible aspects and configurations in addition to that shown are contemplated by the present disclosure. Furthermore, the number of, and placement of, the various components depicted in FIG. 1 are also non-limiting examples of aspects associated with the disclosure. For example, in one non-limiting example, a power system module 24 can be configured, adapted, or proximately located with a particular power-consuming system 20 or subset of power consuming systems 20. In this sense, one or more of a set of power system modules 24 can be associated with supplying power to a respective set or subset of the power-consuming systems 20. The set of power system modules 24 can be associated with supplying power to a respective set or subset of the power-consuming systems 20 both directly (e.g. by way of directly supplying power to the power-consuming system 20) or indirectly (e.g. by way of sharing power supply through other power system modules 24, or by way of the power distribution system 30). In this sense, for example, one or more power system modules 24 can controllably supply power to a particular associated or targeted power-consuming system 20, such as one or more respective propulsion systems 12, 14.

Example power distribution management functions can include, but are not limited to, selectively enabling or disabling the delivery of power to particular electrical loads or power-consuming systems 20, depending on, for example, available power distribution supply, power distribution capacity, criticality of electrical load functionality, or aircraft mode of operation. Non-limiting examples of aircraft mode of operation or aircraft operations can include aircraft flight phases, including but not limited to, aircraft take-off phase, aircraft cruise phase, aircraft approach phase, aircraft landing phase, or aircraft ground operations. Additional management functions can be included. Furthermore, additional power sources for providing power to the electrical loads, such as emergency power sources, ram air turbine systems, generators, auxiliary power units (APUs), batteries, or the like, can be included, and can substitute or supplement the described electrical sources of power.

It will be understood that while aspects of the disclosure are shown in an aircraft environment of FIG. 1, the disclosure is not so limited and has general application to electrical power systems in non-aircraft applications, such as other mobile applications and non-mobile industrial, commercial, and residential applications. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations. It will be understood that the illustrated aspects of the disclosure are only one non-limiting example of an aircraft 10, and many other possible aspects and configurations in addition to that shown are contemplated by the present disclosure.

Furthermore, the number of, and placement of, the various components depicted in FIG. 1 are also non-limiting examples of aspects associated with the disclosure. For example, while various components have been illustrated with relative position of the aircraft (e.g. the power-consuming systems 20 on the wings of the aircraft 10, etc.), aspects of the disclosure are not so limited, and the components are not so limited based on their schematic depictions. Additional aircraft 10 configurations are envisioned.

Figure 2:
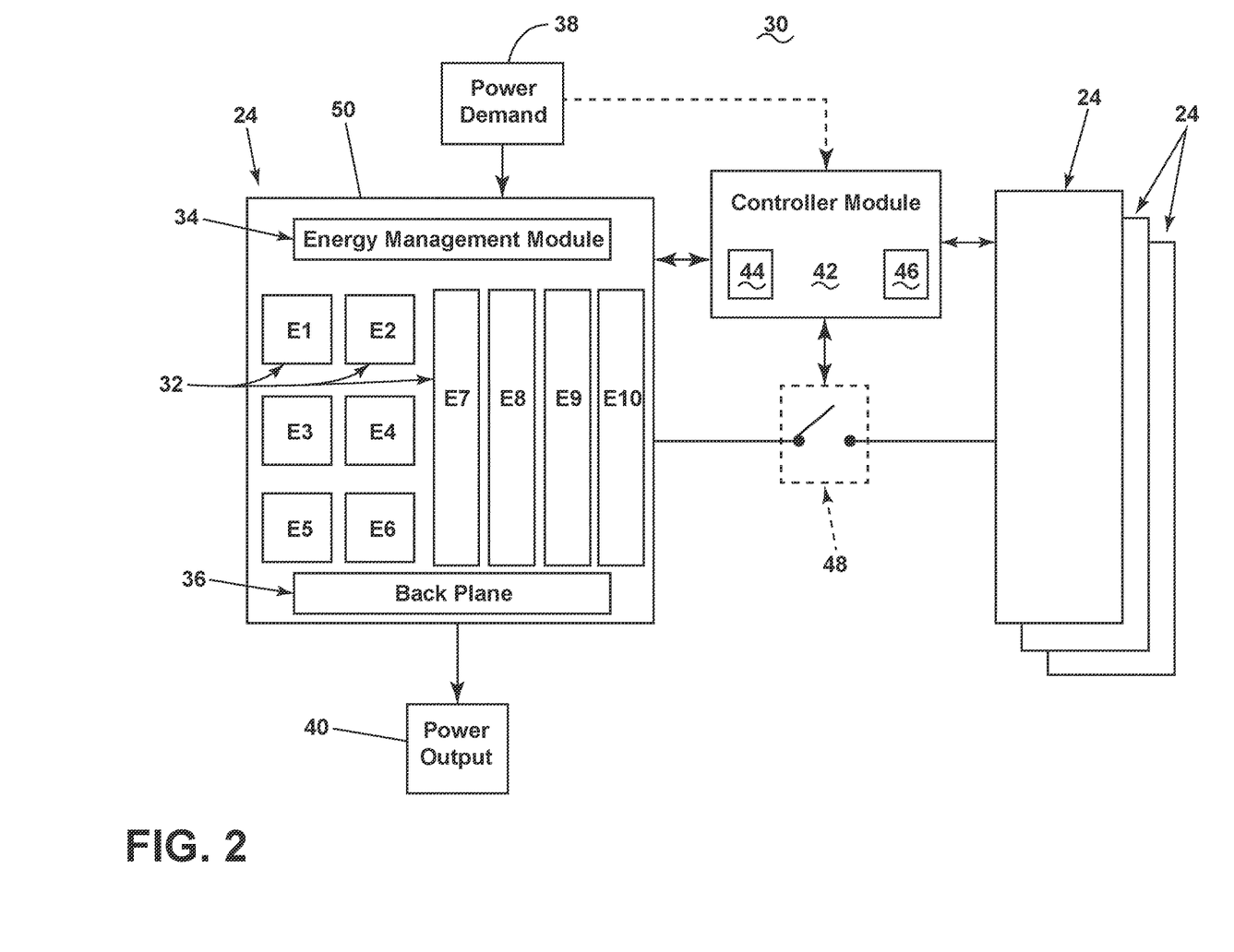
FIG. 2 is a schematic illustration of aspects of the power distribution system of the aircraft of FIG. 1, in accordance with various aspects described herein.

Referring now to FIG. 2, a schematic illustration is shown of an exemplary power distribution system 30 that can be utilized in the aircraft 10. The power distribution system 30 is shown having a set of power system modules 24. Aspects of the disclosure can be included wherein, for example, each power system module 24 can include a set of energy modules 32 (labeled "E1", "E2", etc.), an energy management module 34, and a backplane 36. Non-limiting aspects of the disclosure can be included wherein at least a subset of power system module 24 components can be attached to, fastened to, or otherwise contained within a frame or chassis 50 of the power system module 24.

The set of energy modules 32 can include one or more replaceable energy module, one or more electrically dischargeable energy modules, or a combination thereof. As used herein, "replaceable" denotes a physically removeable aspect describing how one or more energy modules 32 can be independently removed from the power system module 24, and replaced with a similar or like-kind exchange of another energy module 32. Aspects of the disclosure can be included wherein the power system module 24, the energy module 32, or a combination thereof are designed to facilitate the removal or replacement by a user or automated system without significant effort. Aspects such as locks, ties, mechanical fasteners, hooks, levers, or the like can facility the removal or replacement features, while reliably retaining the energy module 32 outside of removal or replacement. In this sense, the set of energy modules 32 can be selectively interconnected with the chassis 50.

Additionally, non-limiting examples of the energy modules 32 can include, but are not limited to, "dischargeable" or "rechargeable" sources of electrical energy, such as fuel cells, a battery bank, a battery cell, a rechargeable battery or rechargeable battery bank, a capacitor or capacitor bank, a super capacitor or super capacitor bank, a fuel cell, a hydrogen cell, or a continuously or semi-continuous power conversion or supplying device, such as a solar cell, wind turbine, or any other source of electrical power. In this sense, the power system module 24 can include a dischargeable power system module 24. As illustrated, a variety of different or dissimilar energy modules 32 can be utilized within a single power system module 24 (e.g. see schematic shape of E1 compared with E7). Aspects of the power system module 24 can be configured or adapted to receive an individual power supply from each respective energy module 32, and utilize each individual power supply, or for example combine individual power supplies from a set or subset of the energy modules 32, to form one or more electrical power outputs 40.

While a single power output 40 is illustrated, aspects of the disclosure can be included wherein a single power system module 24 can be configured or adapted to provide multiple power outputs 40, multi-channel power outputs 40, or power outputs 40 having different or dissimilar electrical characteristics. Aspects of the disclosure can include, for example, multi-channel power outputs 40 configured to provide simultaneous power outputs 40. Non-limiting examples of power outputs 40 having different or dissimilar power outputs can include alternating current (AC) power, direct current (DC) power, one or more phases of current, one or more voltage levels, or a combination thereof. In one non-limiting aspect of the disclosure, the backplane 36 can be configured or adapted to provide the power output 40 or power outputs 40, as well as power conversion, inversion, or the like.

The energy management module 34 can be configured to operably control the power distribution from a set or subset of the energy modules 32 to meet a power demand, such as a power demand during aircraft 10 operations, during aircraft flight operations, during aircraft flight phases, or the like. In the example shown a power demand signal 38 can be provided to at least one of the power system module 24 or the energy management module 34, indicating a power demanded to meet electrical expectations for one or more electrical loads or power-consuming systems 20. In this sense, the energy management module 34 can include a controller module having a processor and memory, and can be configured to controllably operate or selectively discharge a set or subset of the energy modules 32, by way of the backplane 36, to supply power to the power output 40 in electrical form or electrical characteristics meeting the power demand 38. As described, the power demand 38 for an individual power system module 24 can be associated with or respectively assigned to target a particular set or subset of power-consuming systems 20 or power-consuming subsystems.

Aspects of the disclosure can be included wherein power supply can be shared with or in-between individual power system modules 24. As shown, multiple power system modules 24 can be selectively interconnected (for example by switch 48 shown in dotted box), and operated such that a first power system module 24 could deliver a power supply to a second power system module 24. As shown, such operable sharing can be controllably implemented or enabled by way of a controller module 42 having a processor 44 and memory 46. In one non-limiting example, the controller module 42 can include, or can be incorporated into the controller module of the energy management module 34, as described herein. In another non-limiting example, the operably sharing can be controllably implemented or enabled in response to the power demand 38 described herein, such as when a power demand 38 for the first power system module 24 is lowered or reduced, when a power demand 38 for the second power system module 24 is heightened or increased, or a combination thereof.

In such an example, the first power system module 24 could selectively discharge one or more of the set of energy modules 32 to recharge one or more energy modules 32 of the second power system module 24. In this sense, the power distribution system 30 or power system modules 24 can operably share power between other power system modules 24 during at least one of the aircraft cruise phase, aircraft approach phase, aircraft landing phase, a combination of phases, or the like.

In further non-limiting examples of the disclosure, the energy management module 34, or a controller module 42 thereof, of one of the set of power system modules 24 (such as a first power system module 24) can be further configured to predict a cumulative flight operation power demand 38 for the remainder of the current aircraft flight operation. In another non-limiting example or alternative non-limiting example of the disclosure, the energy management module 34 of one of the set of power system modules 24 (such as a first power system module 24) can be further configured to estimate a cumulative flight operation power demand 38 for the remainder of the current aircraft 10 flight operation. As used herein, the "cumulative flight operation power demand" for the remainder of the flight can include the predicted or estimated total amount of power the power-consuming system 20 is expected to consume until the aircraft has landed or taxied to a destination point. Non-limiting examples of the "cumulative" power demand can further include additional or buffer power demand 38 in order to provide flexibility in scheduling and prediction or estimation.

In this sense, the energy management module 34, or a controller module 42 thereof, of one of the set of power system modules 24 can compare the predicted or estimated cumulative flight operation power demand 38 with a quantity of dischargeable power of the power system module 24. In the example, the energy management module 34 can be further configured to determine an excess quantity of dischargeable power of the respective power system module 24 or multiple power system modules 24 that exists based on the comparison when the quantity of dischargeable power of the one or more power system modules 24 is greater than the predicted or estimated cumulative flight operation power demand 38 for the remainder of the current aircraft flight operation. Non-limiting examples of the disclosure can be included wherein the quantity of dischargeable power of the respective power system module 24 can be included by way of power sensing of one or more of the respective energy modules 32, estimating past discharge, or the like.

If an excess quantity of dischargeable power of the respective power system module 24 exists based on the aforementioned comparison, the energy management module 34, or a controller module 42 thereof, can be further configured to operably share the excess quantity of dischargeable power of the respective power system modules 24 with another one of the set of power system modules 24 to at least partially recharge one or more of the set of energy modules 32 of the another power system module 24. In these non-limiting examples, the first power system module 24 can operably share power with another power system module 24 until, for instance, the first power system module 24 substantially discharges the set or a subset of the energy modules 32. In a non-limiting example, as used herein, "substantially discharge" the energy modules 32 can include depleting or discharging the energy modules 32 until less than five percent of stored energy charge remains. In another non-limiting example, as used herein, "substantially discharge" the energy modules 32 can include depleting or discharging the energy modules until less than ten percent of stored energy charge remains. In yet another non-limiting example, the first power system module 24 can operably share power with another power system module 24 until, for instance, the second power system module 24 or a set or subset of energy modules 32 thereof are recharged.

In yet another non-limiting example, the first power system module 24 can operably share power with another power system module 24 in order to reduce the number of energy modules 32 of the power system module 24, or aircraft 10 overall, to be replaced in-between aircraft operations. Stated another way, the first power system module 24 can operably share power with another power system module 24 to controllably limit, reduce, or otherwise minimize the total number of replaceable energy modules 32 to be replaced during a future replacement or ground maintenance operation.

Figure 3:
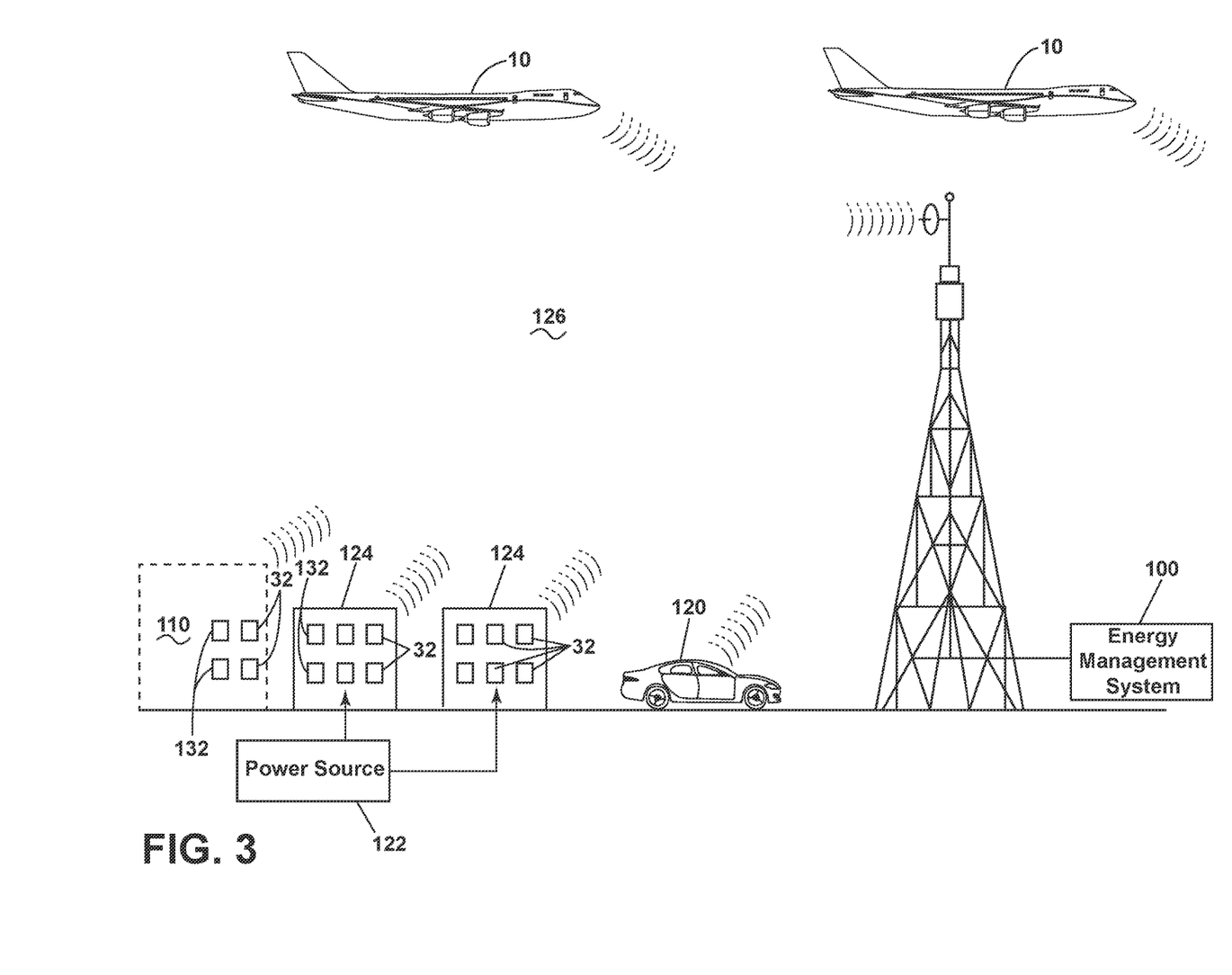
FIG. 3 is a schematic illustration of an energy management system for a fleet of aircraft, such as the aircraft of FIG. 1, in accordance with various aspects described herein.

FIG. 3 is a schematic illustration of an energy management system 100 for a fleet of aircraft 10, 110, such as the aircraft 10 of FIG. 1. While example aspects of the disclosure are illustrated at an airport 126, non-limiting aspects of the disclosure can be applicable to any location utilizing energy modules 32. As shown, the airport 126 can include aircraft 10 flying within range of the airport 126, including but not limited to, aircraft 10 taking off or landing, passing by, or even aircraft 110 located on the ground, such as aircraft 110 that have arrived at the airport 126 as a destination, aircraft 110 obtaining maintenance actions, aircraft 110 preparing for a future flight plan, or a combination thereof. In yet another non-limiting example, a non-aircraft vehicle, shown as a car 120, is included, as another example device that can utilize both the energy management system 100, or a power distribution system utilizing the power system module 24 described herein.

The airport 126 can further include charging stations 124 for charging, recharging, or otherwise storing energy modules 32. As shown, the charging stations can be electrically coupled with a power source 122, such as terrestrial-based power grids, or the like to provide energy for charging or recharging energy modules 32. As a non-limiting example, a discharged energy module 132 is illustrated as included in a charging station 124, to convey that the charging station 124 can include or store charged energy modules 32 as well as including discharged or currently-charging energy modules 132.

Also, as shown in non-limiting example, the aircraft 110 shown on the ground of the airport 126 includes both charged energy modules 32, which can be included in the power system module 24 (not illustrated for brevity), as well as discharged energy modules 132 that can be removed or replaced prior to the next flight plan. For instance, maintenance or ground-based workers can remove the discharged energy modules 132, transport them to an empty bay of the charging station 124 for recharging, and transport charged energy modules 132 from the charging station 124 back to the aircraft 110.

The aircraft 10, 110, car 120, charging stations 124, and the like, can all be communicatively connected with the energy management system 100 (show, for example, using wireless transmission). While wireless transmission is shown, any wired or wireless communicative medium, transmission, data transfer protocol, Internet transmission, or the like can be included to enable or otherwise make communication with the energy management system 100 operable.

Figure 4:
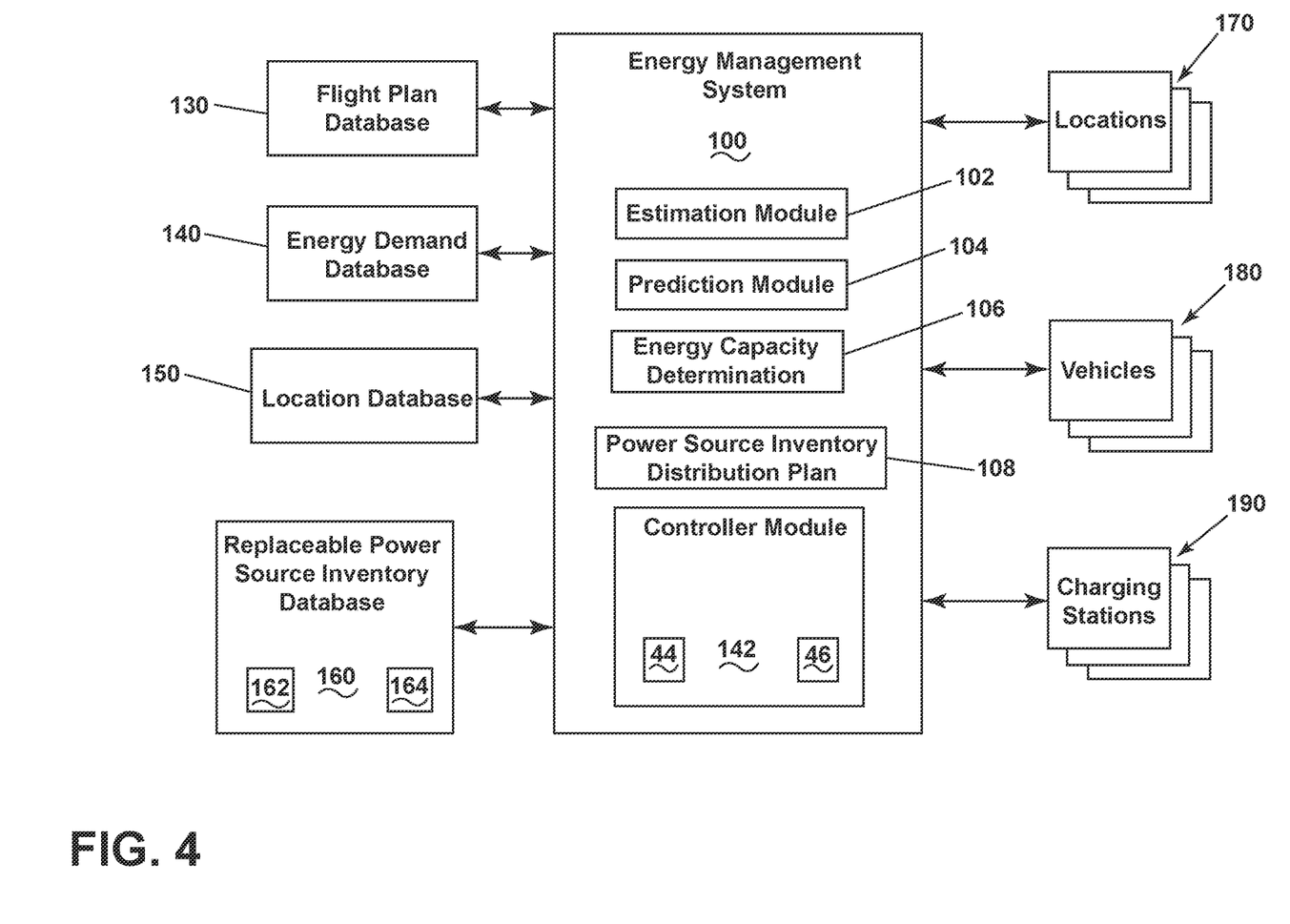
FIG. 4 is schematic system illustration of the energy management system of FIG. 3, in accordance with various aspects described herein.

FIG. 4 is schematic system illustration of the energy management system 100 of FIG. 3, in accordance with various aspects described herein. As shown, the energy management system 100 can include any combination of an estimation module 102, a prediction module 104, an energy capacity determination module 106, a power source inventory distribution plan module 108, a controller module 142 having a processor 144 and memory 146, or the like. As shown, the controller module 142 can be similar to the previously described controller module 42.

The energy management system 100 can interact with a number of other system components. The communication is illustrated by arrows between components. In one non-limiting example, the energy management system 100 can interact with or communicate with a flight plan database 130. The flight plan database 130 can include, for instance, a desired flight plan for a period of time for one or more aircraft 10, 110, such as a fleet of aircraft 10, 110. In another non-limiting example, the flight plan database 130 can include or define at least a desired flight plan for each of the fleet of aircraft 10, 110 and a location of each of the fleet of aircraft 10, 110.

In another non-limiting example, the energy management system 100 can interact with or communicate with an energy demand database 140. The energy demand database 140 can include information or data related to predicted, estimated, or otherwise known energy demands for at least one of aircraft 10, 110 models, flight plan information (for example, flight legs between location sources and destinations), individual aircraft system or subsystem energy demands (for example, certain propulsion systems, certain computer systems, or the like), or information related to flights. Example information related to flights can include non-limiting aspects such as weight estimates or predictions, current weather information, historical or predicted weather information, manifest information, or the like. As used herein, the "energy demand" can include an amount of quantity of power, electrical power, or another characteristic related to power, such as energy module 32 information or date related to flight plan energy demands.

In another non-limiting example, the energy management system 100 can interact with or communicate with a location database 150. The location database 150 can include or define, for example, energy management system 100 data related to particular locations, including but not limited to, airports 126, charging station 124 locations, charging station charging or storage capacity at a respective location, or the like.

In yet another non-limiting example, the energy management system 100 can interact with or communicate with a replaceable power source inventory database 160. The replaceable power source inventory database 160 can include information or data related to the replaceable power sources, such as energy modules 32, 132 utilized by the fleet of vehicles, cars 120, aircraft 10, 110, or the like. In non-limiting example, each energy module 32, 132 can further include data or information related to a charge state 162 or current location 164 of the energy module 32, 132. Non-limiting examples of a charge state 162 can include a current charging or discharging rate, a current charge level, any health monitoring data related to the energy module, 32, 132, the like, or a combination thereof.

Non-limiting examples of a current location 164 of the energy module 32, 132 can include assignment or allotment to a particular vehicle, car 120, aircraft 10, 110, or charging station 124, a location of that respective vehicle, car 120, aircraft 10, 110, or charging station 124, or even more precise location information such as a charging station 124 or storage bay location, or a particular installation location in a power system module 24 of an aircraft 10, 110 (e.g. third module of the propulsion-assigned power system module 24, third row, second column, or the like), or the like. In this sense, the replaceable power source inventory database 160 can define particular information or data related to the set of energy modules 32, 132.

The energy management system 100 can receive information or data from at least a subset of the flight plan database 130, the energy demand database 140, the location database 150, the replaceable power source inventory database 160, or the like. During operation, the energy management system 100, or the controller module 142 thereof, can estimate an energy demand for at least a subset of desired flight plans for the fleet of vehicles, such as the fleet of aircraft 10, 110. In one non-limiting example, the estimation module 102 or the prediction module 104 can be utilized to estimate or predict a cumulative energy demand for a set of desired flight plans. The estimating or predicting the energy demand can be at least partially based on data received by the flight plan database 130 defining a set of desired flight plans, data received from the location database 150 defining desired flight plan departure and arrival information and energy management system 100 capabilities at those respective departure and arrival locations, data received from the energy demand database 140 to estimate or predict energy demands of a desired flight plan (for instance, based on known aircraft system or subsystem information), data received from the replaceable power source inventory database 160 defining available energy module 32, 132 placement and capacity information, or a combination thereof.

In this sense, the energy management system 100 can receive the aforementioned information or data, or a subset thereof, and estimate or predict an energy demand for the set of desired flight plans for the fleet. Based on that estimated or predicted energy demand, the energy management system 100 can compare or determine how that estimated or predicted energy demand relates to the current replaceable power source inventory or a future replaceable power source inventory. In non-limiting examples, the current the current replaceable power source inventory or a future replaceable power source inventory can be determined, compared, predicted, estimated, or some combination thereof, by the energy capacity determination module 106, based at least on the replaceable power source inventory database 160 information or data.

As used herein, a "current replaceable power source inventory" can include the current state of the set of energy modules 32, 132 defined by or tracked by the energy management system 100 or the replaceable power source inventory database 160, while a "future replaceable power source inventory" can include or incorporate aspects of energy modules 32, 132 that can be charged or recharged, or will have arrived by way of transport, such as from an arriving aircraft 10, 110 or car 120, by the time the desired flight plan is acted upon or departs.

It is understood that during this comparison or determine how that estimated or predicted energy demand relates to the current replaceable power source inventory or a future replaceable power source inventory, only a subset of the desired flight plans can find adequate allotment of energy demanded. It is further envisioned that in some instances, a set or subset of desired flight plans can be configured, updated, altered, or otherwise modified, based on adequate or inadequate allotment of energy demanded. In this sense, the comparison or determination can further determine that at least a subset of energy modules 32, 132 (current replaceable power source inventory, future replaceable power source inventory, or a combination thereof) can meet the determination, the demand, or the like, for at least a subset of the desired flight plans, and can assign, allot, locate, or the like, the respective energy modules 32, 132 for the subset of the desired flight plans. Stated another way, the comparison or determination can determine that a sufficient amount, quantity, number, or the like, of energy modules 32, 132 are locatable for a particular subset of desired flight plans, such that those desired flight plans can operate while meeting or exceeding the energy demand for those respective desired flight plans.

In response to the determination that a sufficient amount, quantity, number, or the like, of energy modules 32, 132 are locatable for a particular subset of desired flight plans, the energy management system 100 can generate, for example, by way of the power source inventory distribution plan module 108, a power source inventory distribution plan locating, assigning, allotting, or the like, the respective energy modules 32, 132 for the respective desired flight plan. In this sense, the energy management system 100 produces or generates a distribution plan enabling distribution of the energy module 32, 132 according to the desired or now-assigned flight plans. In non-limiting examples, the produced or generated power source inventory distribution plan can include the current or predicted location of the energy modules 32, 132 at the time the energy modules 32, 132 will be needed for the desired flight plan, a charge or charging state of the respective energy modules 32, 132, and the like, for the fleet of aircraft 10, 110 operating the desired flight plan.

The power source inventory distribution plan or energy management system 100 can include or output one or more guides, reports, instructions, or operation manuals for enabling the allocation of the set of energy modules 32, 132 in accordance with the power source inventory distribution plan. In non-limiting examples, the power source inventory distribution plan or energy management system 100 can output a set of location plans 170, such as a location plan 170 for each respective location implicated or utilized in the power source inventory distribution plan. In this example, people, staff, workers, or the like, can operate the charging stations 124, move or distribute the energy modules 32, 132, or the like, for that respective location in order to accommodate, accomplish, enable, or otherwise operate the location in accordance with the power source inventory distribution plan.

In non-limiting example, the power source inventory distribution plan or energy management system 100 can include or output a set of vehicle plans 180, such as a vehicle plan 180 for each respective vehicle, car 120, aircraft 10, 110, or the like, in the fleet implicated or utilized in the power source inventory distribution plan. In this example, people, staff, workers, or the like, can replace, exchange, load or unload, the assigned or allotted energy modules 32, 132, or the like, in accordance with the power source inventory distribution plan. In another non-limiting example, the vehicle plan 180 can provide guidance for multiple travel legs of a desired flight plan or travel plan over a period of operation. In this sense, the set of vehicle plans 180 can be utilized in order to accommodate, accomplish, enable, or otherwise operate the particular vehicle in accordance with the power source inventory distribution plan.

In yet non-limiting example, the power source inventory distribution plan or energy management system 100 can include or output a set of charging station plans 190, such as a list, a manifest, an assignment, and expectation, or the like, for energy modules 32, 132 (including specific energy modules 32, 132) arriving at a location that need to be charged or recharged, and implicated or utilized in the power source inventory distribution plan. In this example, people, staff, workers, or the like, can replace, exchange, load or unload, the assigned or allotted energy modules 32, 132, or the like, into and out from the set of charging stations 124 at a respective location in accordance with the power source inventory distribution plan. In another non-limiting example, the vehicle plan 180 can provide guidance for multiple energy modules 32, 132 over a period of charging or recharging time, or charging or recharging operation. In this sense, the set of charging station plans 190 can be utilized in order to accommodate, accomplish, enable, or otherwise operate the particular charging stations in accordance with the power source inventory distribution plan.

Figure 5:
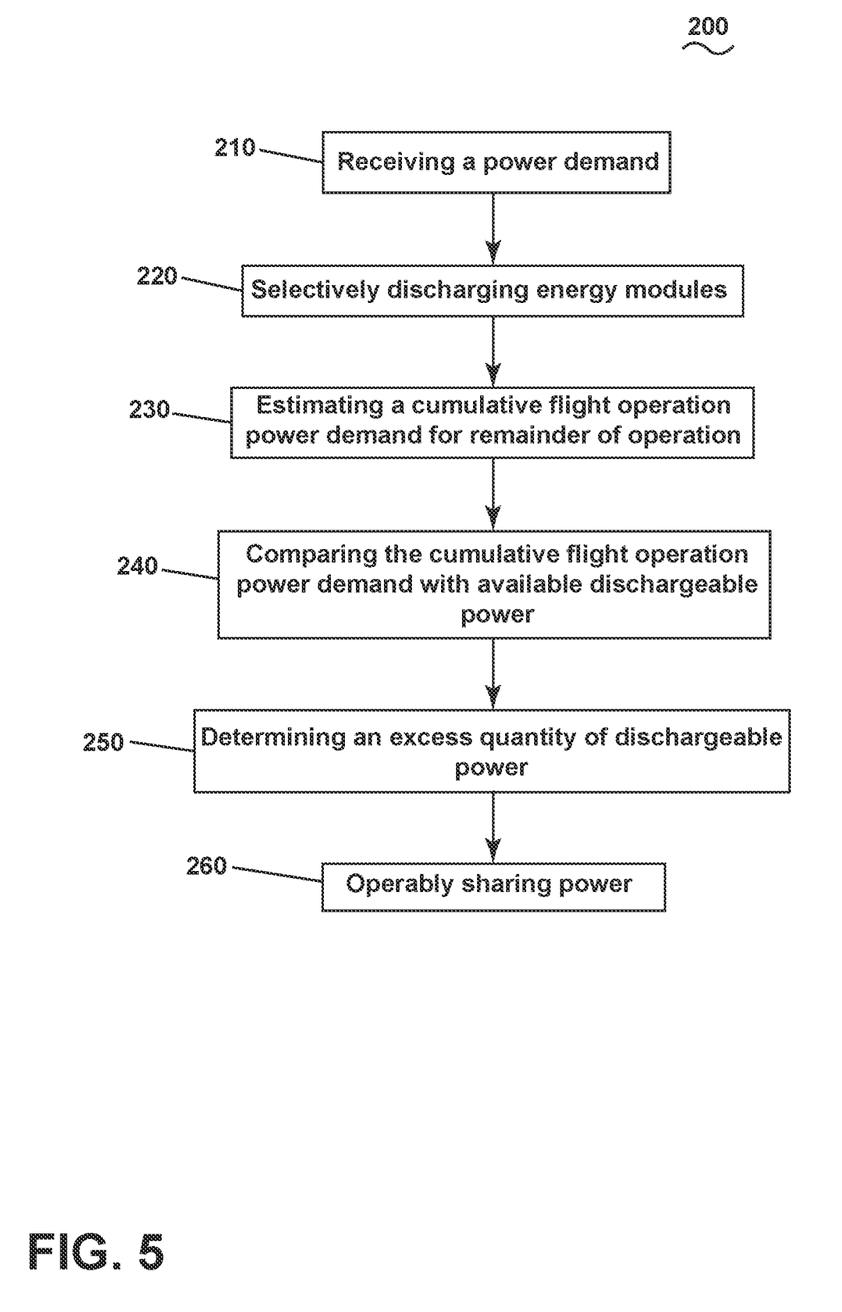
FIG. 5 is an example flow chart diagram of demonstrating a method of operating a dischargeable power system module of an aircraft, in accordance with various aspects described herein.

FIG. 5 is an example flow chart diagram of demonstrating a method 200 of operating a dischargeable power system module 24 of a vehicle, such as an aircraft 10, 110, in accordance with various aspects described herein. The method 200 of operating a dischargeable power system module 24 of an aircraft 10, 110, the dischargeable power system module 24 having a set of replaceable dischargeable energy modules 32, 132 selectively interconnected to define at least one power system module power output 40, includes receiving, at an energy management module 34 having a controller module, a power demand 38 for a set of power-consuming subsystems 20 respectively associated with and operably powered by the dischargeable power system module 24, at 210. The method 200 can include, for example, in response to receiving the power demand 38, selectively discharging at least a subset of replaceable dischargeable energy modules 32, 132 housed in a chassis 50 of the dischargeable power system module 24 to meet the power demand 38, at 220.

Non-limiting aspects of the disclosure can be included where the method 200 includes estimating, by the energy management module 34, a cumulative flight operation power demand 38 for the remainder of an aircraft 10, 110 flight operation, at 230. In another non-limiting aspect, the method 200 can include comparing, by the energy management module 34, the cumulative flight operation power demand with a quantity of dischargeable power of the dischargeable power system module 24, at 240. In yet another non-limiting aspect of the disclosure, the method 200 can include, determining, by the energy management module 34, an excess quantity of dischargeable power exists based on the comparison when the quantity of dischargeable power of the dischargeable power system module 24 is greater than the estimated cumulative flight operation power demand for the remainder of the aircraft 10, 110 flight operation, at 250. In yet another non-limiting aspect of the disclosure, the method 200 can include operably sharing power between the dischargeable power system module 24 and other dischargeable power system modules 24 during at least one of an aircraft 10, 110 cruise phase, aircraft 10, 110 approach phase, or aircraft 10, 110 landing phase, in order to reduce the number of energy modules 32, 132 of the aircraft 10, 110 to be replaced in-between aircraft 10, 110 operations.

The sequence depicted is for illustrative purposes only and is not meant to limit the method 200 in any way as it is understood that the portions of the method 200 can proceed in a different logical order, additional or intervening portions can be included, or described portions of the method can be divided into multiple portions, or described portions of the method can be omitted without detracting from the described method. For instance, in one non-limiting aspect of the disclosure, the method 200 can include operably sharing power between the dischargeable power system module 24 and other dischargeable power system modules 24 until the dischargeable power system module 24 substantially discharges the set of energy modules 32, 132. In another non-limiting aspect of the disclosure, the method 200 can include operably sharing power between the dischargeable power system module 24 and other dischargeable power system modules 24 includes operably sharing power until the set of rechargeable energy modules 32, 132 of the other dischargeable power system modules 24 are recharged.

In yet another non-limiting example aspect of the disclosure, the method 200 can further include ejecting at least one substantial discharged energy module 32, 132 from the aircraft 10, 110 during flight operations. Non-limiting examples of ejecting a discharged energy module 32, 132 can include ejecting a completely discharged energy module 32, 132 to reduce weight of the aircraft 10, 110, to reduce risks associated with carrying a discharged or partially discharged energy module 32, 132, to eliminate an energy module 32, 132 experiencing a failure, for example, as determined by an energy module 32, 132 health system or battery health system, the like, or a combination thereof.

In yet another non-limiting example aspect, the remainder of the aircraft 10, 110 flight operation includes at least two legs of a flight plan. In this sense, an aircraft 10, 110 can include, be determined to load, or be instructed to load a sufficient number of energy modules 32, 132 to complete more than one flight plan leg, for instance, to avoid a destination between legs that may not have sufficient power source inventory or charged energy module 32, 132 inventory to replace spent or discharged energy modules 32, 132.

In yet another non-limiting example aspect of the disclosure, operably sharing power further comprises determining a capacity of replacement energy modules 32, 132 at an aircraft 10, 110 destination, such as an airport 126 or other location, and operably sharing power to discharge a subset of the energy modules 32, 132 replaceable by the capacity of replacement energy module 32, 132. In yet another non-limiting aspect of the method 200, determining a capacity of replacement energy modules 32, 132 can further include estimating recharging of rechargeable replacement energy modules 32, 132, for instance by a charging station 124, and predicting at least a subset of the rechargeable replacement energy modules 32, 132 will be recharged, for instance, by the time they would be needed to meet a desired flight plan. In yet another non-limiting example of the method, operably sharing power can prioritize recharging at least a subset of rechargeable energy modules 32, 132 of at least one of the dischargeable power system module 24 or the other dischargeable power system module 24 based on a determined capacity.

Figure 6:
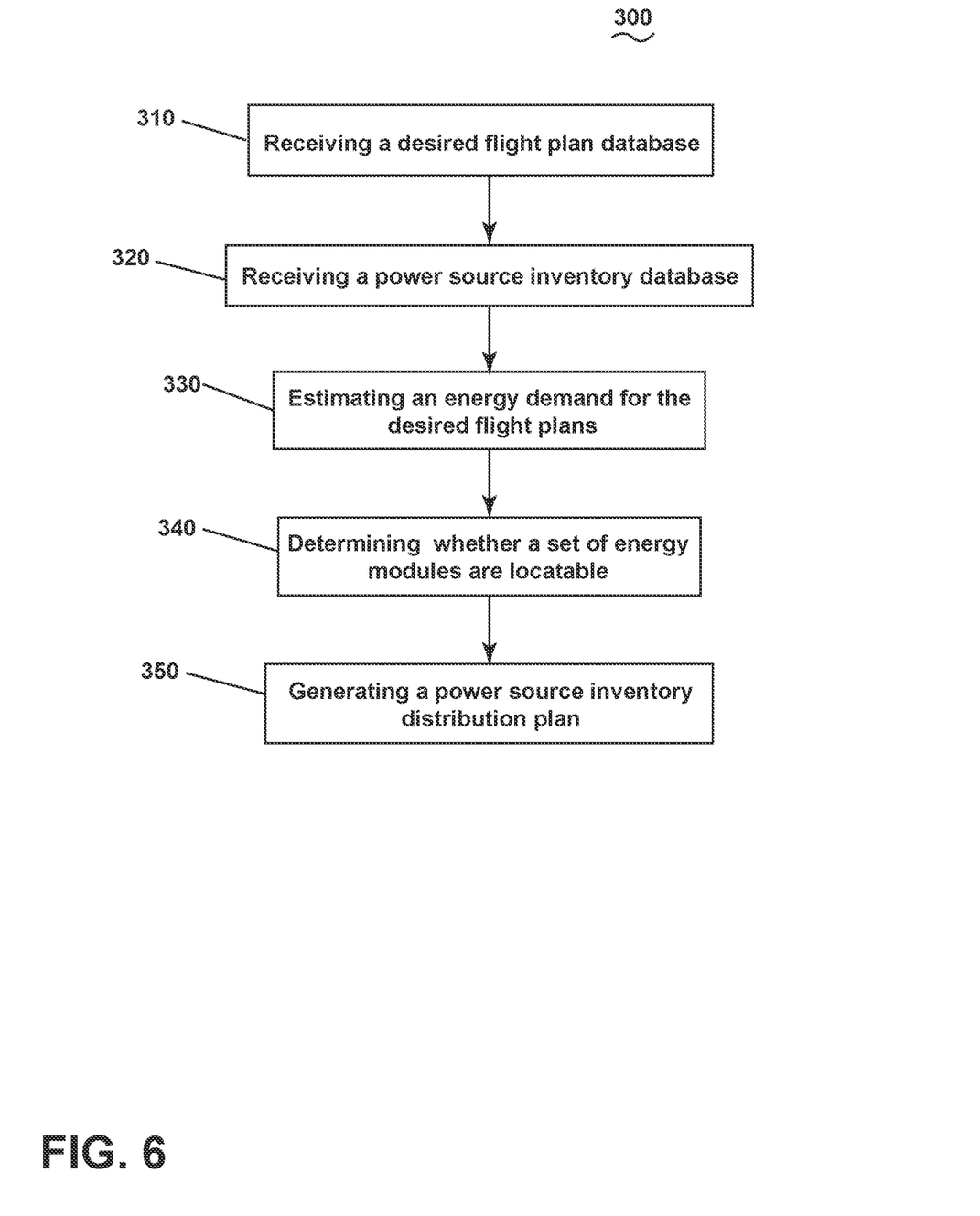
FIG. 6 is an example flow chart diagram of demonstrating a method of operating an energy management system for a fleet of aircraft, in accordance with various aspects described herein.

FIG. 6 is an example flow chart diagram of demonstrating a method 300 of operating an energy management system 100 for a fleet of aircraft 10, 110, in accordance with various aspects described herein. Non-limiting aspects of the method 300 can include receiving, by a controller module 142 of the energy management system 100, a desired flight plan database 130 for the fleet of vehicles or aircraft 10, 110, the desired flight plan database 130 defining at least a desired flight plan for each of the fleet of vehicles or aircraft 10, 110 and a location of each of the fleet of vehicles or aircraft 10, 110, at 310.

Non-limiting aspects of the method 300 can further include receiving, by the controller module 142, a replaceable power source inventory database 160 defining at least a set of dischargeable energy modules 32, 132, at 320. In yet another non-limiting aspect of the disclosure, the method 300 can include estimating an energy demand for at least a subset of the desired flight plans for the fleet of vehicles or aircraft 10, 110, for example, by an estimation module 102, at 330. While "estimating" is described, non-limiting aspects of the disclosure can additionally or alternatively include predicting an energy demand for at least a subset of the desired flight plans for the fleet of vehicles or aircraft 10, 110, for example, by a prediction module 104.

In yet another non-limiting aspect of the disclosure, the method 300 can include determining whether a set of dischargeable energy modules 32, 132 are locatable at a respective location of at least a subset of the fleet of vehicles or aircraft 10, 110 based on at least the replaceable power source inventory database 160 and the subset of desired flight plans of the desired flight plan database 130, at 340. Additionally, or alternatively, the determining whether a set of dischargeable energy modules 32, 132 are locatable at a respective location of at least a subset of the fleet of vehicles or aircraft 10, 110 based on the location database 150. In yet another non-limiting example of the disclosure, the location database, or information contained therein, can be included in the replaceable power source inventory database 160.

In yet another non-limiting aspect of the method 300, based on the determination that set of dischargeable energy modules 32, 132 are locatable at a respective location of at least a subset of the fleet of vehicles or aircraft 10, 110, generate, by the energy management system 100, a power source inventory distribution plan, for example, by way of the power source inventory distribution plan module 108, allocating a subset of dischargeable energy modules 32, 132 for the at least a subset of the desired flight plans for the fleet of vehicles or aircraft 10, 110, at 350.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method. For example, non-limiting aspects of the method 300 can further include loading the set of dischargeable energy modules 32, 132 onto the at least a subset of the fleet of vehicles or aircraft 10, 110 in accordance with the power source inventory distribution plan.

In another non-limiting aspect of the disclosure, the method 300 can include flying the at least a subset of the fleet of aircraft 10, 110 in accordance with respective flight plan and the power source inventory distribution plan. In yet another non-limiting aspect of the disclosure, the method 300 can include updating the replaceable power source inventory database 160 to reflect the allocated subset of dischargeable energy modules 32, 132 of the power source inventory distribution plan. In yet another non-limiting aspect of the disclosure, the method 300 can be included wherein receiving the desired flight plan database 130 defining a least a desired multi-leg flight plan for at least a subset of the fleet of aircraft 10, 110, and a location for each leg of the respective flight plan.

In yet another non-limiting aspect of the disclosure, the method 300 can be included wherein estimating includes estimating an energy demand for each leg of the desired multi-leg flight plan, and determining whether a set of dischargeable energy modules 32, 132 are locatable at at least a subset of respective locations for each leg of the respective flight plan. In yet another non-limiting example of aspects of the disclosure, the method 300 can be included wherein generating a power source inventory distribution plan includes allocating a subset of dischargeable energy modules 32, 132 for a respective multi-leg flight plan.

In yet another non-limiting aspect of the disclosure, the method 300 can be included wherein allocating a subset of dischargeable energy modules 32, 132 for a respective multi-leg flight plan includes allocating a first subset of dischargeable energy modules 32, 132 for a first leg of the respective multi-leg flight plan and allocating a second subset of dischargeable energy modules 32, 132 for a second leg of the respective multi-leg flight plan. In yet another non-limiting aspect of the disclosure, the method 300 can be included wherein the first subset of dischargeable energy modules 32, 132 meets the estimated energy demand for the first leg of the respective multi-leg flight plan and wherein the second subset of dischargeable energy modules 32, 132 meets the estimated energy demand for the second leg of the respective multi-leg flight plan.

In yet another non-limiting aspect of the disclosure, the method 300 can be included wherein the first subset of dischargeable energy modules 32, 132 meets the estimated energy demand for the first leg of the respective multi-leg flight plan and at least partially meets the estimated energy demand for the second leg of the respective multi-leg flight plan. In yet another non-limiting aspect of the disclosure, the method 300 can further include generating, by the energy management system 100, a charging plan 190 for operating a set of charging stations 124 to recharge a discharged subset of energy modules 32, 132 such that the subset of discharged energy modules 32, 132 are recharged and available at a respective location in accordance with the power source inventory distribution plan. In yet another non-limiting aspect of the disclosure, the method 300 can be included wherein the desired flight plan database 130 defines temporal data for the desired flight plan for each of the fleet of vehicles or aircraft 10, 110, and wherein the generating the power source inventory distribution plan allocates a subset of dischargeable energy modules 32, 132 in accordance with the temporal data of the at least a subset of the desired flight plans for the fleet of aircraft 10, 110.

In yet another non-limiting aspect of the disclosure, the method 300 can be included wherein the replaceable power source inventory database 160 further defines a charge state 162 for each of the set of dischargeable energy modules 32, 132, and wherein determining whether a set of dischargeable energy modules 32, 132 are locatable at a respective location includes estimating a recharge time, based on the charge state 162, for each of the set of dischargeable energy modules 32, 132 at the respective location. In yet another non-limiting aspect of the disclosure, the method 300 can include generating, by the energy management system 100, a charging plan 190 for operating a set of charging stations 124 to recharge a discharged subset of energy modules 32, 132, based on the charge state 162 of the set of dischargeable energy modules 32, 132, such that the subset of discharged energy modules 32, 132 are recharged and available at a respective location in accordance with the power source inventory distribution plan.

In yet another non-limiting aspect of the disclosure, the method 300 can include generating updated desired flight plans for at least a subset of the fleet of aircraft 10, 110 to prioritize selective discharging of energy modules 32, 132 based on reallocating dischargeable energy modules 32, 132 at different destinations. In this sense, the prioritized discharging of energy modules 32, 132 can be utilized for reallocating energy modules 32, 132 at locations that lack energy modules 32, 132 or are in need of additional energy modules 32, 132. In yet another non-limiting aspect of the disclosure, the method 300 can be included wherein the replaceable power source inventory database 160 further defines a location of each of the set of dischargeable energy modules 32, 132, and generating, by the energy management system 100, a reallocation plan for balanced reallocation of the dischargeable energy modules 32, 132 at different destinations.

In yet another non-limiting aspect of the disclosure, the method 300 can include receiving, by the controller module 142, a weather database related to the desired flight plans of the fleet of aircraft 10, 110, and generating, by the energy management system 100, a power source inventory distribution plan allocating a subset of dischargeable energy modules 32, 132 for the at least a subset of the desired flight plans for the fleet of aircraft 10, 110, based at least in part on the weather database. In yet another non-limiting aspect of the disclosure, the method 300 can include generating an updated a power source inventory distribution plan, based on an updated desired flight plan database 130 including at least one completed flight plan, and based on an updated replaceable power source inventory database 160 reflecting the set of dischargeable energy modules 32, 132 of the at least one completed flight plan.

In yet another non-limiting aspect of the disclosure, the method 300 can include generating an updated desired flight plan database 130 for at least a subset of the fleet of aircraft 10, 110 based at least on the generated power source inventory distribution plan allocating a subset of dischargeable energy modules 32, 132. In yet another non-limiting aspect of the disclosure, the method 300 can include generating an updated a power source inventory distribution plan, based on an ejection of at least one dischargeable energy module 32, 132 from at least one aircraft 10, 110 during flight. In yet another non-limiting aspect of the disclosure, the method 300 can be repeated on a time basis, repeated after a period of time (e.g. each hour, or each day), or can be repeatable with updates to at least one of respective databases 130, 140, 150, 160, and a new power source inventory distribution plan can be generated.

Many other possible aspects and configurations in addition to that shown in the above figures are contemplated by the present disclosure.

The aspects disclosed herein provide an aircraft utilizing replaceable energy modules and an energy management system utilized for planning and allocating energy modules to meet energy demands of a flight plan for a fleet of vehicles. The technical effect is that the above described aspects enable the design, estimation, prediction, enablement, and implementation of utilizing replaceable energy modules in a fleet of vehicles, such as aircraft, across many locations, vehicles, operators, and considerations of allocation. One advantage that can be realized in the above aspects is that the above described aspects enable intelligent utilization for energy demands based on several factors. One such consideration could include utilizing high energy density energy modules for suitable application, managing the energy module use and utilization to ensure long operational life or maximum performance, or the like.

Another advantage to the aspects of the disclosure can include dedicated power system modules 24 for respective dedicated power-consuming systems or subsystems. Such allocation of power system modules 24 to power-consuming systems can further ensure proper or tailored utilization of particular energy modules 32, 132 where best suited for operational effectiveness of the vehicle. Yet another advantage can include taking into consideration the future travel plan of a particular vehicle or flight plan, and making recommendations for energy modules or uses for pilot of driver review and implementation.

Yet another advantage of aspects of the disclosure can include the use of tailored or modular power energy modules or power system modules having weight dependent on a flight or travel plan rather than fixed energy or weight systems. Stated another way, the weight of energy demanded for a travel plan can be proportional or variably related to the energy demanded, not a fixed over-weight. Yet another non-limiting advantage of the disclosure can include reduced down time or maintenance time due to plug-and-play replacement energy module system. Yet another non-limiting advantage to aspects of the disclosure is ease of implementation and utilization for interchangeable health monitoring, repair, and replacement of individual and independent energy modules.

Yet another advantage to the disclosure is the adaptable across multiple systems, platforms, and vehicles to utilize a common energy module design and configuration.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure can also be embodied in any permutation of aspects of the disclosure, including but not limited to the following technical solutions as defined in the enumerated aspects:

1. An aircraft comprising a power distribution network defining a set of power-consuming subsystems, and a set of dischargeable power system modules, each of the set of dischargeable power system modules associated with supplying power to a respective subset of the power-consuming subsystems, and further comprising a chassis, a set of replaceable dischargeable energy modules selectively interconnected within the chassis, and an energy management module having a controller module configured to operably control the power distribution from the set of energy modules during aircraft operations, based on the energy demands of the respective subset of the power-consuming subsystems, wherein each of the set of dischargeable power system modules can operably share power between other dischargeable power system modules.

2. The aircraft of any preceding clause, wherein aircraft operations are at least one of aircraft flight operations or aircraft flight phases.

3. The aircraft of any preceding clause, wherein each of the set of dischargeable power system modules can operably share power between other dischargeable power system modules during at least one of the aircraft cruise phase, aircraft approach phase, or aircraft landing phase.

4. The aircraft of any preceding clause, wherein the energy management module of one of the set of dischargeable power system modules is further configured to at least one of predict a cumulative flight operation power demand for the remainder of the current aircraft flight operation or estimate a cumulative flight operation power demand for the remainder of the current aircraft flight operation, and compare the cumulative flight operation power demand with a quantity of dischargeable power of the one of the set of dischargeable power system modules.

5. The aircraft of any preceding clause, wherein the controller module is further configured to determine an excess quantity of dischargeable power of the one of the set of dischargeable power system modules exists based on the comparison when the quantity of dischargeable power of the one of the set of dischargeable power system modules is greater than the at least one of predicted or estimated cumulative flight operation power demand for the remainder of the current aircraft flight operation.

6. The aircraft of any preceding clause, wherein the controller module is further configured to operably share the excess quantity of dischargeable power of the one of the set of dischargeable power system modules with another of the set of dischargeable power system modules to at least partially recharge one of the set of energy modules of the another of the set of dischargeable power system modules.

7. The aircraft of any preceding clause wherein the controller module is further configured to operably share power from one of the set of dischargeable power system modules with at least one other of the set of dischargeable power system modules, such that the one of the set of dischargeable power system modules substantially discharges the set of energy modules.

8. The aircraft of any preceding clause, wherein the controller module is further configured to operably share power from one of the set of dischargeable power system modules with at least one other of the set of dischargeable power system modules, until the at least one other of the set of dischargeable power system modules are recharged.

9. The aircraft of any preceding clause, wherein the controller module is further configured to operably share power from one of the set of dischargeable power system modules with at least one other of the set of dischargeable power system modules in order to reduce the number of energy modules of the aircraft to be replaced in-between aircraft operations.

10. The aircraft of claim 1, wherein the set of energy modules includes at least a subset of a battery bank, a battery cell, a super capacitor, a fuel cell, or a hydrogen cell.

11. The aircraft of any preceding clause, wherein at least a subset of dischargeable power system modules is further configured to output multi-channel power outputs simultaneously.

12. The aircraft of any preceding clause, wherein at least a subset of energy modules is ejectable during aircraft operations.

13. A method of operating a dischargeable power system module of an aircraft, the dischargeable power system module having a set of replaceable dischargeable energy modules selectively interconnected to define at least one power system module power output, the method comprising receiving, at an energy management module having a controller module, a power demand for a set of power-consuming subsystems respectively associated with and operably powered by the dischargeable power system module, in response to receiving the power demand, selectively discharging at least a subset of replaceable dischargeable energy modules housed in a chassis of the dischargeable power system module to meet the power demand, estimating, by the energy management module, a cumulative flight operation power demand for the remainder of an aircraft flight operation, comparing, by the energy management module, the cumulative flight operation power demand with a quantity of dischargeable power of the dischargeable power system module, determining, by the energy management module, an excess quantity of dischargeable power exists based on the comparison when the quantity of dischargeable power of the dischargeable power system module is greater than the estimated cumulative flight operation power demand for the remainder of the aircraft flight operation, and operably sharing power between the dischargeable power system module and other dischargeable power system modules during at least one of an aircraft cruise phase, aircraft approach phase, or aircraft landing phase, in order to reduce the number of energy modules of the aircraft to be replaced in-between aircraft operations.

14. The method of any preceding clause, wherein operably sharing power between the dischargeable power system module and other dischargeable power system modules includes operably sharing power until the dischargeable power system module substantially discharges the set of energy modules.

15. The method of any preceding clause, wherein operably sharing power between the dischargeable power system module and other dischargeable power system modules includes operably sharing power until the set of rechargeable energy modules of the other dischargeable power system modules are recharged.

16. The method of any preceding clause, further comprising ejecting at least one substantial discharged energy module from the aircraft during flight operations.

17. The method of any preceding clause, wherein the remainder of the aircraft flight operation includes at least two legs of a flight plan.

18. The method of any preceding clause, wherein operably sharing power further comprises determining a capacity of replacement energy modules at an aircraft destination, and operably sharing power to discharge a subset of the energy modules replaceable by the capacity of replacement energy module.

19. The method of any preceding clause, wherein determining a capacity of replacement energy modules further comprises estimating recharging of rechargeable replacement energy modules, and predicting at least a subset of the rechargeable replacement energy modules will be recharged.

20. The method of any preceding clause, wherein operably sharing power prioritizes recharging at least a subset of rechargeable energy modules of at least one of the dischargeable power system module or the other dischargeable power system modules based on a determined capacity.

21. A method of operating an energy management system for a fleet of aircraft, the method comprising receiving, by a controller module of the energy management system, a desired flight plan database for the fleet of aircraft, defining at least a desired flight plan for each of the fleet of aircraft and a location of each of the fleet of aircraft, receiving, by the controller module, a replaceable power source inventory database defining at least a set of dischargeable energy modules, estimating an energy demand for at least a subset of the desired flight plans for the fleet of aircraft, determining whether a set of dischargeable energy modules are locatable at a respective location of at least a subset of the fleet of aircraft based on at least the replaceable power source inventory database and the subset of desired flight plans of the desired flight plan database, and based on the determination that set of dischargeable energy modules are locatable at a respective location of at least a subset of the fleet of aircraft, generate, by the energy management system, a power source inventory distribution plan allocating a subset of dischargeable energy modules for the at least a subset of the desired flight plans for the fleet of aircraft.

22. The method of any preceding clause, further comprising loading the set of dischargeable energy modules onto the at least a subset of the fleet of aircraft in accordance with the power source inventory distribution plan.

23. The method of any preceding clause, further comprising flying the at least a subset of the fleet of aircraft in accordance with respective flight plan and the power source inventory distribution plan.

24. The method of any preceding clause, further comprising updating the replaceable power source inventory database to reflect the allocated subset of dischargeable energy modules of the power source inventory distribution plan.

25. The method of any preceding clause, wherein receiving the desired flight plan database includes receiving a desired flight plan database defining a least a desired multi-leg flight plan for at least a subset of the fleet of aircraft, and a location for each leg of the respective flight plan.

26. The method of any preceding clause, wherein estimating includes estimating an energy demand for each leg of the desired multi-leg flight plan, and determining whether a set of dischargeable energy modules are locatable at at least a subset of respective locations for each leg of the respective flight plan.

27. The method of any preceding clause, wherein generating a power source inventory distribution plan includes allocating a subset of dischargeable energy modules for a respective multi-leg flight plan.

28. The method of any preceding clause, wherein allocating a subset of dischargeable energy modules for a respective multi-leg flight plan includes allocating a first subset of dischargeable energy modules for a first leg of the respective multi-leg flight plan and allocating a second subset of dischargeable energy modules for a second leg of the respective multi-leg flight plan.

29. The method of any preceding clause, wherein the first subset of dischargeable energy modules meets the estimated energy demand for the first leg of the respective multi-leg flight plan and wherein the second subset of dischargeable energy modules meets the estimated energy demand for the second leg of the respective multi-leg flight plan.

30. The method of any preceding clause, wherein the first subset of dischargeable energy modules meets the estimated energy demand for the first leg of the respective multi-leg flight plan and at least partially meets the estimated energy demand for the second leg of the respective multi-leg flight plan.

31. The method of any preceding clause, further comprising generating, by the energy management system, a charging plan for operating a set of charging stations to recharge a discharged subset of energy modules such that the subset of discharged energy modules is recharged and available at a respective location in accordance with the power source inventory distribution plan.

32. The method of any preceding clause, wherein the desired flight plan database defines temporal data for the desired flight plan for each of the fleet of aircraft, and wherein the generating the power source inventory distribution plan allocates a subset of dischargeable energy modules in accordance with the temporal data of the at least a subset of the desired flight plans for the fleet of aircraft.

33. The method of any preceding clause, wherein the replaceable power source inventory database further defines a charge state for each of the set of dischargeable energy modules, and wherein determining whether a set of dischargeable energy modules are locatable at a respective location includes estimating a recharge time, based on the charge state, for each of the set of dischargeable energy modules at the respective location.

34. The method of any preceding clause, further comprising generating, by the energy management system, a charging plan for operating a set of charging stations to recharge a discharged subset of energy modules, based on the charge state of the set of dischargeable energy modules, such that the subset of discharged energy modules is recharged and available at a respective location in accordance with the power source inventory distribution plan.

35. The method of any preceding clause, further comprising generating updated desired flight plans for at least a subset of the fleet of aircraft to prioritize selective discharging of energy modules based on reallocating dischargeable energy modules at different destinations.

36. The method of any preceding clause, wherein the replaceable power source inventory database further defines a location of each of the set of dischargeable energy modules, and generating, by the energy management system, a reallocation plan for balanced reallocation of the dischargeable energy modules at different destinations.

37. The method of any preceding clause, further comprising receiving, by the controller module, a weather database related to the desired flight plans of the fleet of aircraft, and generating, by the energy management system, a power source inventory distribution plan allocating a subset of dischargeable energy modules for the at least a subset of the desired flight plans for the fleet of aircraft, based at least in part on the weather database.

38. The method of any preceding clause, further comprising generating an updated a power source inventory distribution plan, based on an updated desired flight plan database including at least one completed flight plan, and based on an updated replaceable power source inventory database reflecting the set of dischargeable energy modules of the at least one completed flight plan.

39. The method of any preceding clause, further comprising generating an updated desired flight plan database for at least a subset of the fleet of aircraft based at least on the generated power source inventory distribution plan allocating a subset of dischargeable energy modules.

40. The method of any preceding clause, further comprising generating an updated a power source inventory distribution plan, based on an ejection of at least one dischargeable energy module from at least one aircraft during flight.

What is claimed is:
1. An aircraft comprising:
a power distribution network defining a set of power-consuming subsystems; and
a set of dischargeable power system modules, each of the set of dischargeable power system modules associated with supplying power to a respective subset of the power-consuming subsystems, and further comprising:
a chassis;
a set of replaceable dischargeable energy modules selectively interconnected within the chassis; and
an energy management module having a controller module configured to operably control the power distribution from the set of energy modules during aircraft operations, based on the energy demands of the respective subset of the power-consuming subsystems;

wherein each of the set of dischargeable power system modules can operably share power between other dischargeable power system modules.

2. The aircraft of claim 1, wherein aircraft operations are at least one of aircraft flight operations or aircraft flight phases.

3. The aircraft of claim 2, wherein each of the set of dischargeable power system modules can operably share power between other dischargeable power system modules during at least one of an aircraft cruise phase, an aircraft approach phase, and an aircraft landing phase.

4. The aircraft of claim 3, wherein the energy management module of one of the set of dischargeable power system modules is further configured to at least one of predict a cumulative flight operation power demand for the remainder of the current aircraft flight operation or estimate a cumulative flight operation power demand for the remainder of the current aircraft flight operation, and compare the cumulative flight operation power demand with a quantity of dischargeable power of the one of the set of dischargeable power system modules.

5. The aircraft of claim 4, wherein the controller module is further configured to determine an excess quantity of dischargeable power of the one of the set of dischargeable power system modules exists based on the comparison when the quantity of dischargeable power of the one of the set of dischargeable power system modules is greater than the at least one of predicted or estimated cumulative flight operation power demand for the remainder of the current aircraft flight operation.

6. The aircraft of claim 5, wherein the controller module is further configured to operably share the excess quantity of dischargeable power of the one of the set of dischargeable power system modules with another of the set of dischargeable power system modules to at least partially recharge one of the set of energy modules of the another of the set of dischargeable power system modules.

7. The aircraft of claim 6, wherein the controller module is further configured to operably share power from one of the set of dischargeable power system modules with at least one other of the set of dischargeable power system modules, such that the one of the set of dischargeable power system modules substantially discharges the set of energy modules.

8. The aircraft of claim 6 wherein the controller module is further configured to operably share power from one of the set of dischargeable power system modules with at least one other of the set of dischargeable power system modules, until the at least one other of the set of dischargeable power system modules are recharged.

9. The aircraft of claim 6, wherein the controller module is further configured to operably share power from one of the set of dischargeable power system modules with at least one other of the set of dischargeable power system modules in order to reduce the number of energy modules of the aircraft to be replaced in-between aircraft operations.

10. The aircraft of claim 1, wherein the set of energy modules includes at least a subset of a battery bank, a battery cell, a super capacitor, a fuel cell, or a hydrogen cell.

11. The aircraft of claim 1, wherein at least a subset of dischargeable power system modules is further configured to output to multi-channel power outputs simultaneously.

12. The aircraft of claim 1, wherein at least a subset of energy modules is ejectable during aircraft operations.

13. A method of operating a dischargeable power system module of an aircraft, the dischargeable power system module having a set of replaceable dischargeable energy modules selectively interconnected to define at least one power system module power output, the method comprising:
receiving, at an energy management module having a controller module, a power demand for a set of power-consuming subsystems respectively associated with and operably powered by the dischargeable power system module;
in response to receiving the power demand, selectively discharging at least a subset of the set of replaceable dischargeable energy modules housed in a chassis of the dischargeable power system module to meet the power demand;
estimating, by the energy management module, a cumulative flight operation power demand for the remainder of an aircraft flight operation;
comparing, by the energy management module, the cumulative flight operation power demand with a quantity of dischargeable power of the dischargeable power system module;
determining, by the energy management module, an excess quantity of dischargeable power exists based on the comparison when the quantity of dischargeable power of the dischargeable power system module is greater than the estimated cumulative flight operation power demand for the remainder of the aircraft flight operation; and
operably sharing power between the dischargeable power system module and other dischargeable power system modules during at least one of an aircraft cruise phase, aircraft approach phase, and aircraft landing phase, in order to reduce the number of energy modules of the aircraft to be replaced in-between aircraft flight operations.

14. The method of claim 13, wherein operably sharing power between the dischargeable power system module and other dischargeable power system modules includes operably sharing power until the dischargeable power system module substantially discharges the set of energy modules.

15. The method of claim 13, wherein operably sharing power between the dischargeable power system module and other dischargeable power system modules includes operably sharing power until the set of rechargeable energy modules of the other dischargeable power system modules are recharged.

16. The method of claim 13, further comprising ejecting at least one substantial discharged energy module from the aircraft during flight operations.

17. The method of claim 13, wherein the remainder of the aircraft flight operation includes at least two legs of a flight plan.

18. The method of claim 13, wherein operably sharing power further comprises determining a capacity of replacement energy modules at an aircraft destination, and operably sharing power to discharge a subset of the energy modules replaceable by the capacity of replacement energy modules.

19. The method of claim 18, wherein determining a capacity of replacement energy modules further comprises estimating recharging of rechargeable replacement energy modules, and predicting at least a subset of the rechargeable replacement energy modules will be recharged.

20. The method of claim 18, wherein operably sharing power prioritizes recharging at least a subset of rechargeable energy modules of at least one of the dischargeable power system module or the other dischargeable power system modules based on a determined capacity.

* * * * *